(12) United States Patent
Skog et al.

(10) Patent No.: US 6,775,262 B1
(45) Date of Patent: Aug. 10, 2004

(54) METHOD AND APPARATUS FOR MAPPING AN IP ADDRESS TO AN MSISDN NUMBER WITHIN A WIRELESS APPLICATION PROCESSING NETWORK

(75) Inventors: Robert Skog, Hasselby (SE); Ingvar Berg, Nykill (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 715 days.

(21) Appl. No.: 09/596,802

(22) Filed: Jun. 19, 2000

Related U.S. Application Data

(60) Provisional application No. 60/188,437, filed on Mar. 10, 2000.

(51) Int. Cl.[7] .................................................. H04J 3/24
(52) U.S. Cl. ........................ 370/349; 370/389; 370/352; 370/401
(58) Field of Search ................................ 370/349, 345, 370/389, 467, 352, 465, 466, 338, 401, 354, 328; 455/433, 556, 426, 466, 435, 445; 709/206, 219; 705/44, 34

(56) References Cited

U.S. PATENT DOCUMENTS

| | | | | |
|---|---|---|---|---|
| 5,974,453 A | * | 10/1999 | Andersen et al. | ............ 709/220 |
| 6,516,197 B2 | * | 2/2003 | Havinis et al. | ........... 455/456.1 |
| 6,549,776 B1 | * | 4/2003 | Joong | ........................ 455/433 |
| 6,608,832 B2 | * | 8/2003 | Forslow | ...................... 370/353 |
| 2002/0049675 A1 | * | 4/2002 | Kailamaki et al. | ............ 705/44 |

FOREIGN PATENT DOCUMENTS

| | | | | |
|---|---|---|---|---|
| WO | WO 99/33291 | | 7/1999 | |
| WO | WO 00/04679 | * | 1/2000 | ........... H04L/12/28 |
| WO | WO 00/46963 | * | 8/2000 | ........... H04L/12/66 |

OTHER PUBLICATIONS

Standard Search Report for RS 105432US Completed Jan. 19, 2001, Jan. 23, 2001, EPX.

M. Hoogenboom and P. Steemers, "Security for Remote Access and Mobile Applications", *Computers & Security, International Journal Devoted to the Study of Technical and Financial Aspects of Computer Security*, Elsevier Science Ltd., vol. 19, No. 2, Feb. 2000, pp. 149–163, XP004204675.

* cited by examiner

*Primary Examiner*—Wellington Chin
*Assistant Examiner*—Jamal A. Fox

(57) ABSTRACT

A system and method for associating an MSISDN of a mobile terminal with a temporarily assigned IP address is disclosed. A first server located within a wireless communications network generates and transmits a start packet to a WAP network responsive to an access request by a mobile terminal. The start packet includes the MSISDN of the mobile terminal and an assigned IP address. A second server within the WAP network extracts the MSISDN in the IP address from the received start packet and stores this information together within a database. When a WAP application is utilized, the MSISDN may be determined from the database and placed in an HTTP-header of packets to the WAP application.

12 Claims, 2 Drawing Sheets

METHOD AND APPARATUS FOR MAPPING AN IP ADDRESS TO AN MSISDN NUMBER WITHIN A WIRELESS APPLICATION PROCESSING NETWORK

RELATED APPLICATIONS

This application claims priority from and incorporates herein by reference the entire disclosure of U.S. Provisional Application Serial No. 60/188,437, filed Mar. 10, 2000.

BACKGROUND OF THE INVENTION

1. Technical Field of the Invention

The present invention relates to wireless application protocol (WAP) systems, and more particularly, to the mapping of temporary IP addresses to established MSISDN numbers.

2. Description of Related Art

Wireless application protocol (WAP) is positioned at the conversions of two rapidly evolving network technologies, wireless data and the Internet. Both the wireless data market and the Internet are growing very quickly and are continuously reaching new customers. The explosive growth of the Internet has fueled the creation of new and exciting information services. Most of the technology developed for the Internet has been designed for desktop and larger computers and medium to high bandwidth networks.

Hand held wireless devices present a more constrained computing environment compared to desktop computers. They have less powerful CPU's and memory than desktop systems. Similarly, wireless data networks present a more constrained communications environment compared to wired networks. Wireless networks have fundamental limitations with respect to power, available spectrum and mobility. The WAP specification has been developed to address mobile network characteristics by adapting existing network technologies for the Internet to the specialized requirements of hand-held wireless data devices.

Access to a wireless application protocol system utilizing WAP technologies is provided via a WAP gateway node. The WAP gateway node is normally located within an Internet service provider (ISP) providing access to the Internet for mobile terminals. However, the WAP gateway node may alternatively be provided by a mobile services operator. In order to obtain access to the WAP gateway node, a user must be authenticated. There are two possible authentication points for a user. The first authentication point is during setup of a data call. This authentication is handled by the integrated access system (IAS) located within a mobile switching center utilized by the mobile terminal and/or a remote authentication dial-in user service (RADIUS) authentication server located in the WAP network.

The user may also be authenticated when accessing particular servers within the WAP network. This manner of authentication may be handled in two different ways. Proxy authentication may be used wherein the WAP gateway returns a status code of "407" to a WAP browser. This initiates the same type of basic authentication as occurs for a hypertext transport protocol (HTTP) message. A user ID and password are entered by the user in response to this status code and this data is included within every IP packet from the browser.

A WAP gateway supports several different types of bearer messages, for example, IP, SMS, USSD, etc. A MSISDN is used within the WAP gateway to determine if a user is allowed to use the WAP gateway node, to charge for using the WAP gateway node, and to enable charges for specific content to be transmitted. If SMS or USSD bearer protocols are used, the MSISDN is always included within the data packet and this poses no identification problems for the WAP gateway. However, when using the IP protocol, the integrated access system within the mobile switching center allocates a temporary IP address to the mobile terminal. This IP address is included within messages transmitted to the WAP gateway. The WAP gateway has no way at present to determine the MSISDN number associated with a particular IP address. Thus, some manner for enabling the WAP gateway to associate the temporary IP addresses with a fixed MSISDN number is desired.

SUMMARY OF THE INVENTION

The present invention overcomes the foregoing and other problems with a system and method for associating an MSISDN number of a mobile terminal with a temporarily assigned IP address for use with authentication, billing and personalization processes in a network. In response to a wireless network access request by a mobile terminal, a first server located within the wireless network, generates a start packet. The start packet contains an MSISDN of the mobile terminal and an IP address assigned to the mobile terminal by the first server. The start packet is transmitted to a second server within a wireless application protocol network wherein a second server extracts the MSISDN and the assigned IP address from the start packet and stores the MSISDN and the assigned IP address within a database. The database enables storage of the MSISDN and the IP address together such that the database may be accessed using an interface to determine an MSISDN associated with the IP address.

The first server may also generate stop packets responsive to disconnection of the mobile terminal from the wireless network. The stop packet also contains the MSISDN and assigned IP address of the mobile terminal and, responsive to receipt of the stop packet, the second server determines the MSISDN and IP address from the stop packet and deletes these entries from the database.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION

Figure 1:
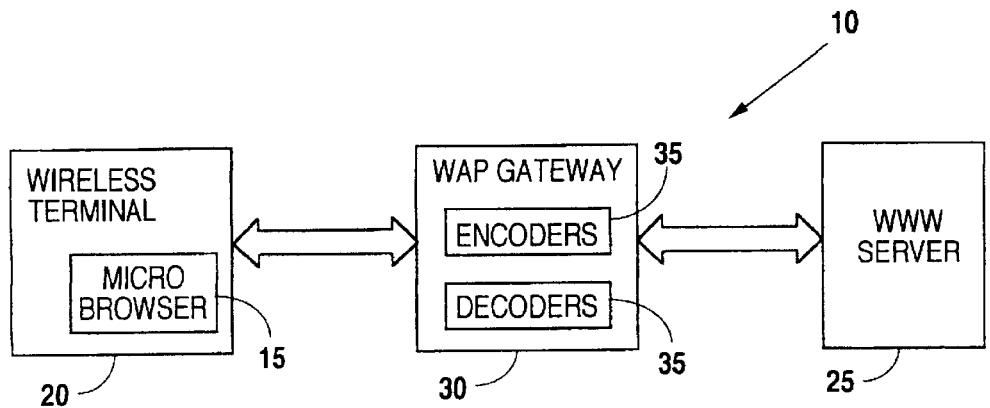
FIG. 1 is a block diagram illustrating a WAP network.

Referring now to the drawings, and more particular to FIG. 1, there is illustrated a WAP network 10. A micro browser 15 within a wireless terminal 20 enables the user to access world wide web servers 25 on the Internet via a WAP gateway server 30. The WAP gateway 30 comprises a protocol gateway which translates requests from a WAP protocol (WSP, WTP, WTLS and WDP) to a WWW protocol (HTTP and TCP/IP). This is accomplished via content encoders and decoders 35 within the WAP gateway server 30.

Figure 2:
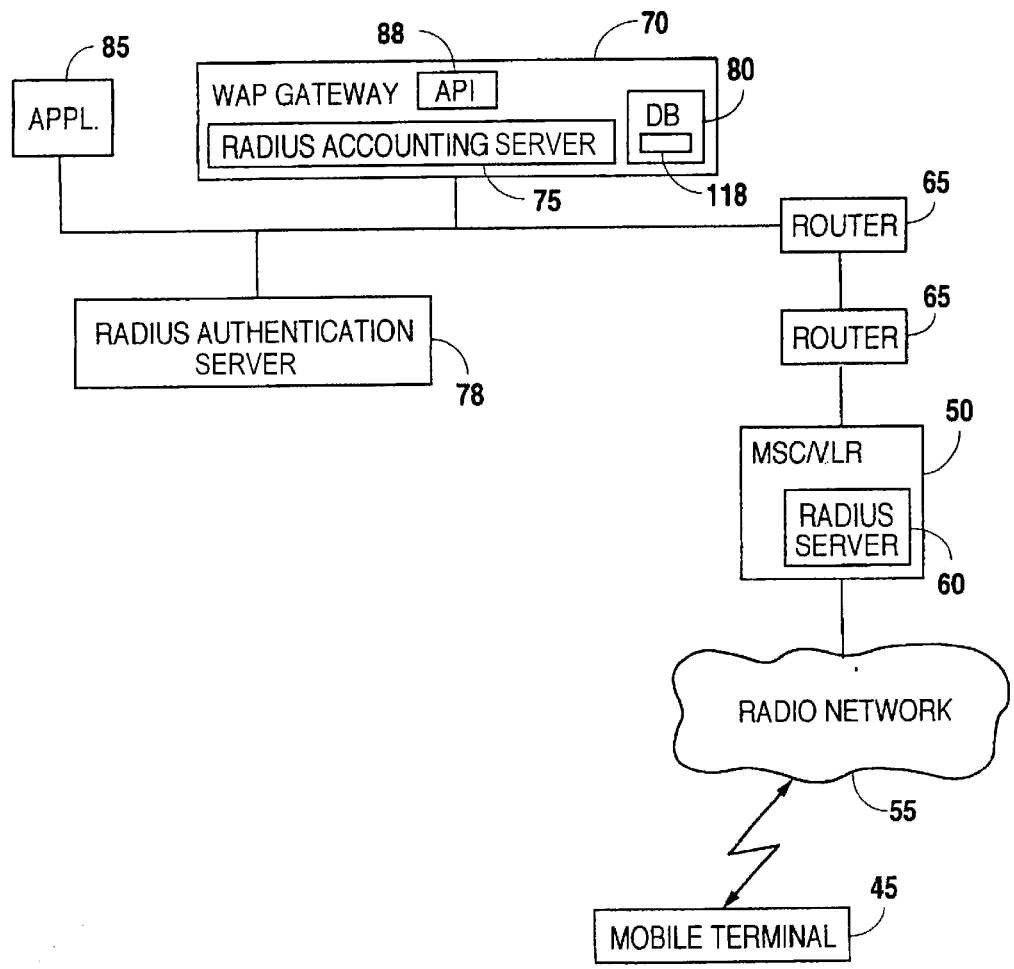
FIG. 2 is a block diagram of a WAP network incorporating the IP to MSISDN mapping technique of the present invention.

Referring now to FIG. 2, there is illustrated a block diagram of a system which utilizes radius accounting messages as a manner for mapping IP addresses to an MSISDN number. While the following description of mapping an IP address to an MSISDN number is done with respect to an authentication process, the system and method may also be used with a billing process, personalization process, etc. The system includes a mobile terminal 45 which may comprise a mobile telephone, portable computer, personal data assistant or any other mobile electronic device capable of communicating with a MSC/VLR 50 via a wireless radio network 55. It should be well understood by one skilled in the art that the wireless radio network for communicating between the mobile terminal 45 and MSC/VLR 50 would consist of a base transceiver station, base station and other components necessary within a wireless radio network.

While the described embodiment uses RADIUS Accounting messages to carry out the described invention, other systems performing similar functions may be used. When a client is configured to use RADIUS Accounting, at the start of service delivery the client will generate an Accounting Start packet describing the type of service being delivered and the user to whom the service is being delivered. The Accounting start packet is sent to the RADIUS Accounting server, which will send back an acknowledgment that the packet has been received. At the end of service delivery the client will generate an Accounting Stop packet describing the type of service that was delivered and optionally statistics such as elapsed time, input and output octets, or input and output packets. The client will send that to the RADIUS Accounting server, which will send back an acknowledgment that the packet has been received. By the present invention, RADIUS is used for transmitting IP-address and MSISDN at session start. Other types of information can also be transmitted, e.g., by using RADIUS Accounting for billing or personalization procedures. Other systems capable of transmitting the IP address and MSISDN information between the networks might also be used in place of a RADIUS system.

The MSC/VLR 50 includes a remote authentication dial-in user service (RADIUS) server 60 configured to transmit a RADIUS accounting message from the MSC/VLR 50 to the WAP gateway 70. The RADIUS accounting messages are transported to the WAP gateway 70 through routers 65 interconnecting the MSC/VLR 50 and the WAP gateway 70. A RADIUS accounting server 75 is located within the WAP gateway 70. The RADIUS accounting server 75 is responsive to the received RADIUS accounting messages from the MSC/VLR 50 and upon receipt of these messages updates a mapping session database 80 within the WAP gateway 70. The mapping session database 80 includes a plurality of storage locations for an assigned temporary IP address and an associated MSISDN of the mobile terminal 45.

The RADIUS accounting messages comprise packets of data which describe the type of service being delivered, and the user to which the service is to be delivered. Information in the packet includes among other things, the MSISDN number, number of frames, and the IP address of the mobile terminal 45. The information within a packet relating to IP address and MSISDN number is used to update the database 80 within the WAP gateway 70. RADIUS accounting messages indicating the stoppage of a connection between a mobile terminal 45 and the WAP gateway 70 cause the database 80 to be updated such that the MSISDN and IP address for the mobile terminal are no longer stored and associated together in the database.

Once a mobile terminal 45 has been properly authenticated by the WAP gateway 70 and the IP address and the IP address and MSISDN of the mobile terminal stored in the database 80, the mobile terminal may access applications 85 within the WAP network. The RADIUS authentication server, in collaboration with a translation application program (API) interface 88, provides a conduit for the database 80, enabling applications to access and determine a MSISDN associated with an IP address for the mobile terminal 45.

Figure 3:
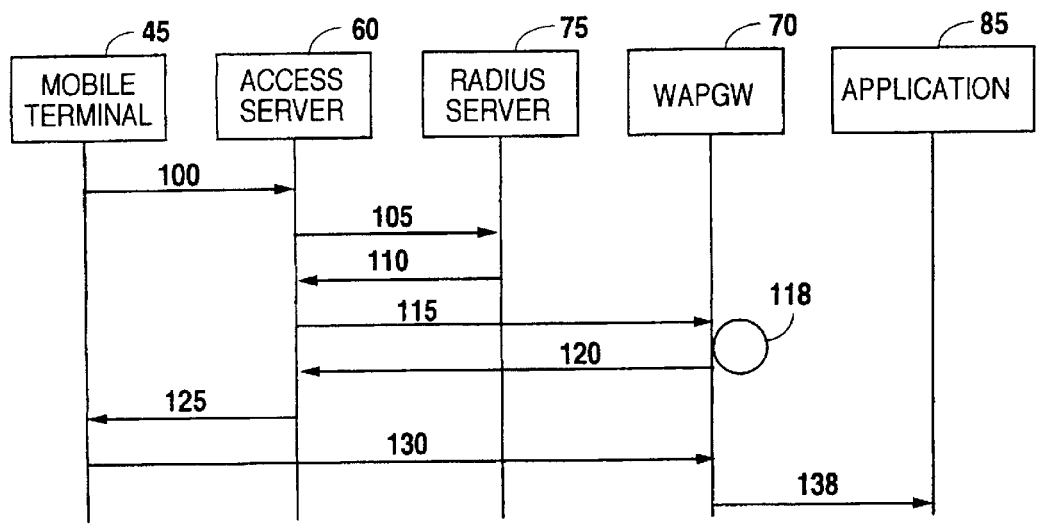
FIG. 3 is a signaling diagram illustrating a request of a particular WAP application by a mobile terminal.

Referring now to FIG. 3, there is provided a first example of a signaling diagram utilizing the method for mapping a MSISDN number to a temporarily assigned IP address for a mobile terminal 45 accessing a WAP gateway 70. The process illustrated in FIG. 3 describes when a mobile terminal 45 requests use of a WAP application 85 residing upon a web server on the Internet. The mobile terminal 45 transmits a message 100 to the access server 60 in order to establish a connection to the access server using the point-to-point protocol (PPP). Before establishing a connection with the mobile terminal 45, the access server 60 performs an authentication process wherein the mobile terminal 45 transmits authentication information including the PPP User ID of the mobile terminal and a password to the access server 60 using a password authentication procedure (PAP).

The access server 60, residing within the mobile switching center 50 (FIG. 2) generates an access request message 105 for transmission to the RADIUS Authentication server 78 located within the WAP gateway 70. The access request message 105 includes the PPP User ID and password transmitted to the access server 60 by the mobile terminal 45. The access request message comprises a request from the access server 60 to the RADIUS server 75 requesting user access to a particular site. The RADIUS server 75 replies to the access server 60 with an access accept message 110 to indicate that access has been granted to the mobile terminal 45.

Next, a PPP connection is established between the access server 60 and the mobile terminal 45. IP packets are transmitted over the connection. The only information included about the sender within the IP packets transmitted over the PPP connection is the IP address of the source mobile terminal 45. The IP address cannot alone be used as a user ID since the IP address is dynamically allocated to the mobile terminal 45 by the access server 60 or the RADIUS server 75 during the PPP connection setup.

To overcome this problem, the IP address and the MSISDN of the mobile terminal 45 are transmitted over the PPP connection from the access server 60 to the WAP gateway 70 as an accounting request message 115 to enable mapping between these identifiers. The IP address and the MSISDN are stored as a record 118 within the mapping session database 80 within the WAP gateway 70. The WAP gateway 70 replies to the accounting request message 115 by means of a mandatory accounting response message 120 to the access server 60 using the RADIUS protocol. Once this connection is established, the user may generate a request 130 for access to a particular WAP application 85 ("service") on a web server. This request is forwarded from the mobile terminal 45 to the WAP gateway 70. The WAP gateway 70 forwards the mobile terminal request 138 to the requested application 85. The WAP gateway 70 may determine the IP address of the mobile terminal 45 by examining the IP packet header to determine the IP address of the mobile terminal. The MSISDN of the mobile terminal 45 is determined by examining the mapping session database 80 and the associated IP address via the application program interface 88. The determined MSISDN is placed in an HTTP header of packets used to contact the WAP application 85.

Figure 4:
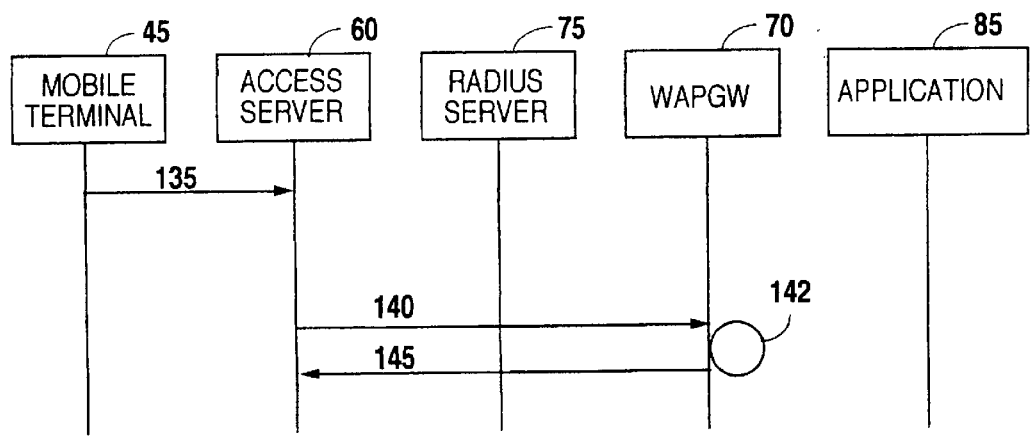
FIG. 4 is a signaling diagram illustrating the termination of a PPP connection between a mobile terminal and the WAP gateway.

Referring now to FIG. 4, there is illustrated a signaling diagram wherein a mobile terminal 45 with an established PPP connection to the access server 60 terminates the PPP connection. Initially, the mobile station 45 terminates at 135 the PPP connection with the access server 60. In response to the termination of the PPP connection, the access server 60 transmits an accounting request stop message 140 to the WAP gateway 70. This request includes the MSISDN and IP address of the mobile terminal 45. In response to the accounting request stop message 140, the WAP gateway 70 removes the entry within the mapping session database 80 associated with the MSISDN number and IP address. The WAP gateway 70 responds to the accounting request stop message by means of an accounting response message 145 acknowledging cancellation of the PPP connection.

The previous description is of a preferred embodiment for implementing the invention, and the scope of the invention should not necessarily be limited by this description. The scope of the present invention is instead defined by the following claims.

What is claimed is:

1. A method for associating a MSISDN with a temporary IP address within a WAP network, comprising the steps of:
    transmitting a start packet to a server associated with the WAP gateway node, the start packet including a MSISDN and a temporary IP address of the mobile terminal; and
    storing the MSISDN and the temporary IP address in a database wherein the MSISDN and the temporary IP address are associated with each other responsive to the start packet,
    when a WAP application is utilized, determining the MSISDN of the mobile terminal by accessing the database,
    placing the determined MSISDN into an http header; and
    transmitting the http header to a WAP application with a data packet,
    configuring a RADIUS authentication server to transmit an account stop packet as the stop packet,
    transmitting a stop packet to the server associated with the WAP gateway node, the stop packet including the MSISDN and the temporary IP address of the mobile terminal; and
    deleting the stored MSISDN and the temporary IP address from the database responsive to the stop packet.

2. The method of claim 1, further comprising the step of transmitting an acknowledgment packet from the server responsive to the stop packet.

3. The method of claim 1, wherein the step of transmitting further comprises the step of configuring an access server to transmit starting packet as the start packet.

4. The method of claim 1, wherein the step of transmitting further comprises the step of configuring the RADIUS authentication server to transmit an account starting packet as the start packet.

5. The method of claim 4, further comprising the step of transmitting an acknowledgment packet from the server responsive to the start packet.

6. The method of claim 1, wherein the method is used in at least one of an authentication process, a billing process, and a personalization process.

7. A system for associating a MSISDN of a mobile terminal with a temporarily assigned IP address, comprising:
    a first server associated with a wireless network for generating a start packet responsive to an access request from a mobile terminal, the start packet containing a MSISDN provided by the mobile terminal and an IP address assigned to the mobile terminal by the first server.
    a database associated with a WAP network having storage locations for a plurality of MSISDNs and associated assigned IP addresses; and
    a second server associated with the WAP network for extracting the MSISDN and the IP address from the start packet and storing the MSISDN and the IP address in the database wherein the second server comprises a RADIUS accounting server including a translation application program interface for enabling access to the database by a WAP application configured to place the determined MSISDN into an http header; and transmit the http header to a WAP application with a data pack.

8. The system of claim 7, wherein the second server is located within a WAP gateway of the WAP network.

9. The system of claim 7, wherein the first server comprises an integrated access system server.

10. The system of claim 7, wherein the second server is configured to:
    receive the session start packet from the first server in response to an access request from the mobile terminal;
    store the MSISDN number and the temporary IP-address in the database associated with the WAP gateway; and
    update the mapping session database by removing the MSISDN number and the temporary IP-address in response to a receipt of a stop packet.

11. The system of claim 7, wherein the first server further generates a stop packet responsive to termination of a connection with the mobile terminal.

12. The system of claim 7, wherein the system associates a MSISDN of a mobile terminal with a temporarily assigned IP address during at least one of an authentication process, a billing process and a personalization process.

* * * * *

UNITED STATES PATENT AND TRADEMARK OFFICE
CERTIFICATE OF CORRECTION

| | | |
|---|---|---|
| PATENT NO. | : 6,775,262 B1 | |
| APPLICATION NO. | : 09/596802 | |
| DATED | : August 10, 2004 | |
| INVENTOR(S) | : Skog et al. | |

It is certified that error appears in the above-identified patent and that said Letters Patent is hereby corrected as shown below:

Title page (75), under Inventors deletes Nykill and inserts --Nykil-- therefor

Title page (56), under OTHER PUBLICATIONS deletes EPX and insert --EPO-- therefor In Column 6, Line 18, in Claim 7, after "server" delete "," and insert --,--, therefor Signed and Sealed this Eleventh Day of March, 2008

JON W. DUDAS
*Director of the United States Patent and Trademark Office*